Oct. 13, 1925.

F. J. HARDMAN 1,556,988

CONNECTING MECHANISM

Filed July 28, 1919

Witnesses
E Richard Noe
Walter W Riedel

Inventor
Frederick J. Hardman
Kerr, Page, Cooper and Hayward
Attorneys

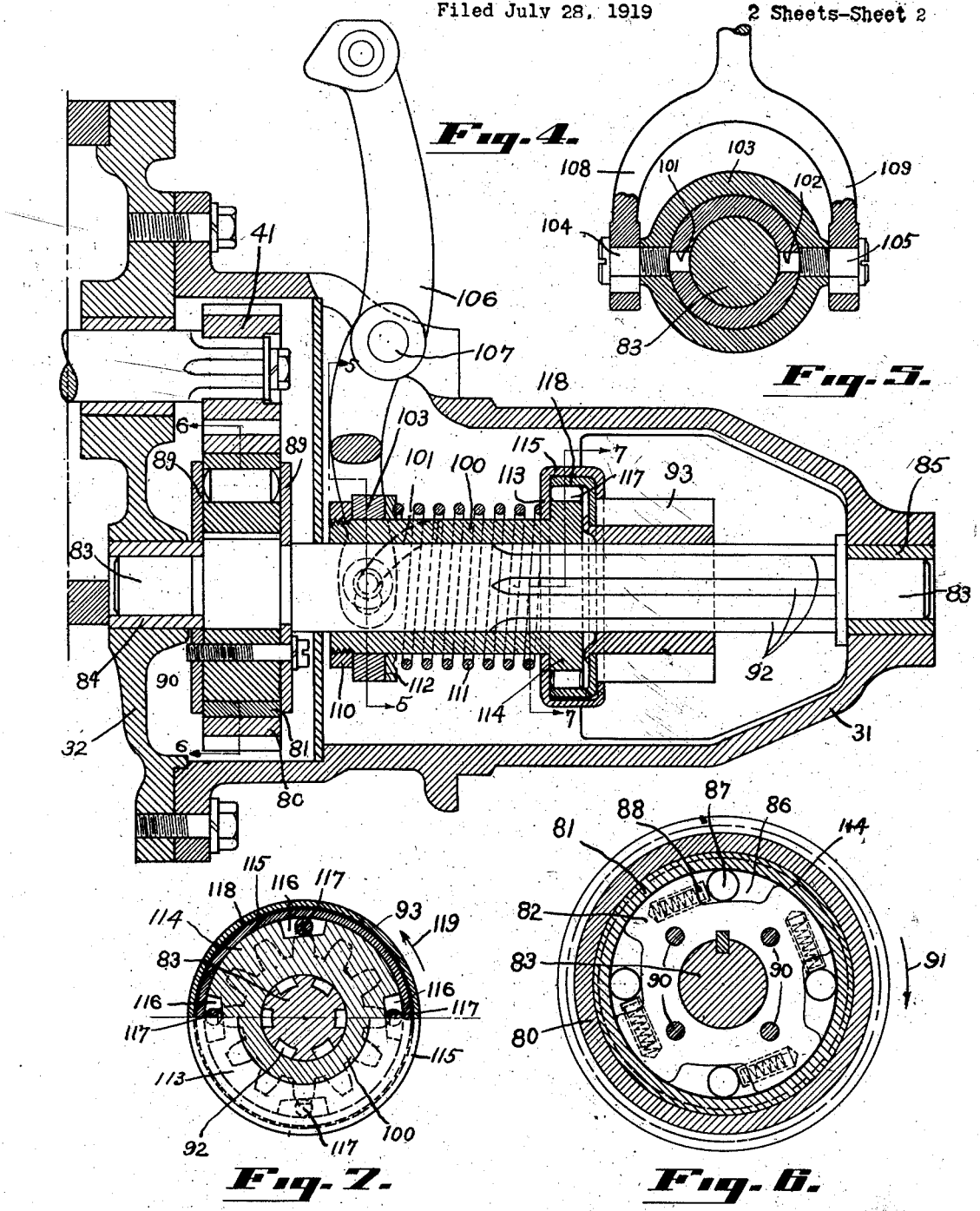

Patented Oct. 13, 1925.

1,556,988

UNITED STATES PATENT OFFICE.

FREDERICK J. HARDMAN, OF DAYTON, OHIO, ASSIGNOR TO THE DAYTON ENGINEERING LABORATORIES COMPANY, OF DAYTON, OHIO, A CORPORATION OF OHIO.

CONNECTING MECHANISM.

Application filed July 28, 1919. Serial No. 313,716.

*To all whom it may concern:*

Be it known that I, FREDERICK J. HARDMAN, a citizen of the United States of America, residing at Dayton, county of Montgomery, State of Ohio, have invented certain new and useful Improvements in Connecting Mechanism, of which the following is a full, clear, and exact description.

This invention relates to mechanisms for connecting a rotatable device with a gear which is normally disconnected from the rotatable device. This invention is particularly adapted for use in connecting an electric motor with the fly wheel gear or other gear in an internal combustion engine in order to start the engine.

In starting devices of this character, where gearing connections are effected before the starting device operates to crank the engine, it is generally the practice to provide a manually operable device for effecting the engagement of gearing between the starting device and engine, and for causing the starting device to operate. Difficulty has been experienced in the past due to the fact that the starting device may begin to operate before the gearing connections are fully made, sometimes resulting in damage to the gear teeth. This frequently happens when the gears are not in enmeshing alignment when they are brought into engagement. In order to overcome this difficulty, devices have been provided which effect an initial movement of certain of the gearing through an initial operation of the starting device in order to bring the gears into enmeshing alignment.

It is one of the objects of the present invention to connect the starting device with the engine manually no matter what the position of the connecting gearing may be before the starting device is operated; and then, after the connecting gears are in substantially full engagement, to cause the starting device to operate. One manner of carrying out this object is to provide a manually operated device which will shift a gear associated with the starting device into engagement with a gear connected with the engine; and which will operate in case the gears collide with one another and prevent enmeshment, to effect rotation of the gear of the starting device to bring it into registration with the engine gear so that enmeshment of the gears may be effected without requiring the operation of the starting device.

Further objects and advantages of the present invention will be apparent from the following description, reference being had to the accompanying drawings, wherein a preferred embodiment of the present invention is clearly shown.

In the drawings:

Fig. 4 is a longitudinal sectional view on an enlarged scale of the gearing connections between the starting motor and the engine shown in Fig. 1;

Fig. 5 is a sectional view of certain parts taken on the line 5—5 of Fig. 4;

Fig. 6 is a sectional view taken on line 6—6 of Fig. 4;

Fig. 7 is a sectional view taken on line 7—7 of Fig. 4.

Figure 1:
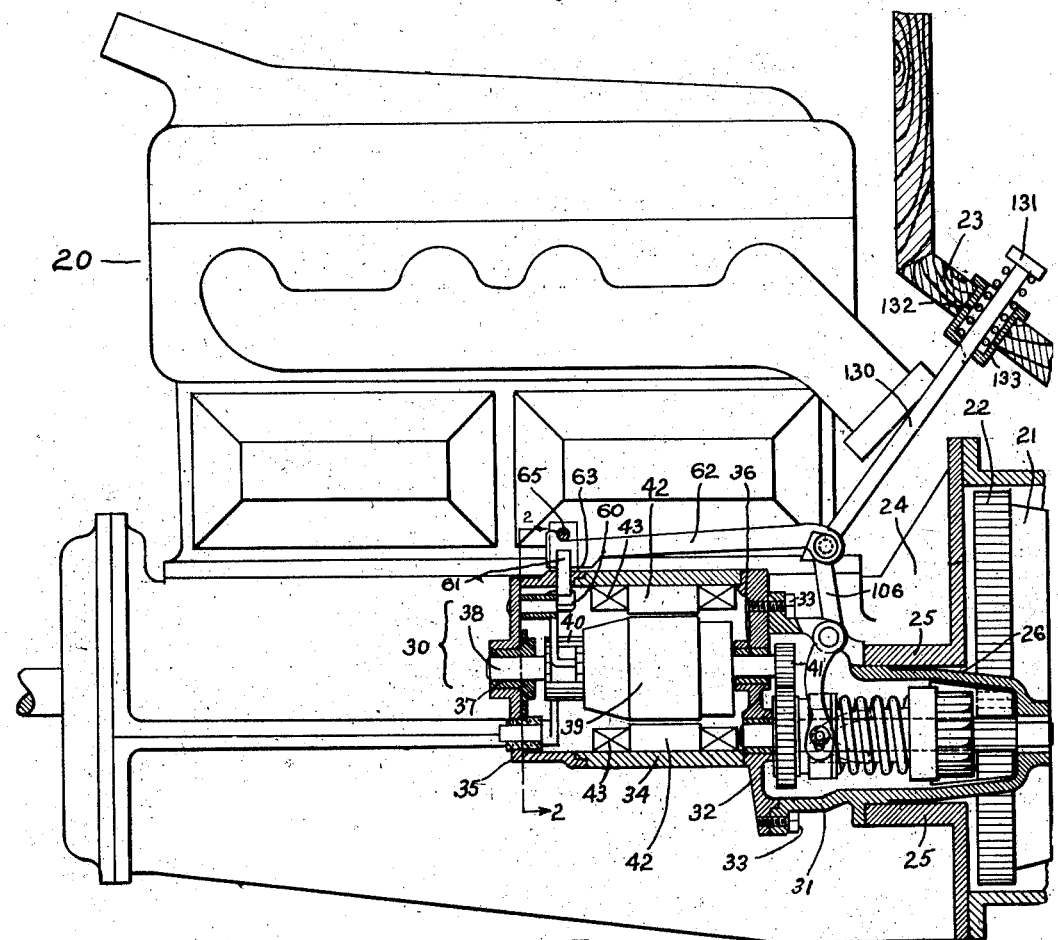
Fig. 1 is a side elevation of an internal-combustion engine to which a starting device embodying the present invention is applied, said starting device being shown in section.

In the drawings an internal-combustion engine 20 is provided with a fly wheel 21 having a fly wheel gear 22. This engine 20 is of the automobile type, and 23 indicates the floor board of the automobile. The crank case 24 of the engine 20 is provided with an annular flange which surrounds an aperture 26 into which projects a portion of the starting device designated as a whole by numeral 30.

The starter 30 comprises a gear housing 31 which is secured to the flange 25 in any suitable manner as by means of bolts, not shown. To this housing 31 is secured a motor end frame 32 by means of bolts 33. To end frame 32 is secured in any suitable manner a motor field shell 34 which in turn supports a motor end frame 35. End frames 32 and 35 carry bearings 36 and 37, respectively, upon which is journalled a motor armature shaft 38. Shaft 38 carries armature 39, commutator 40 and gear 41.

Figure 2:
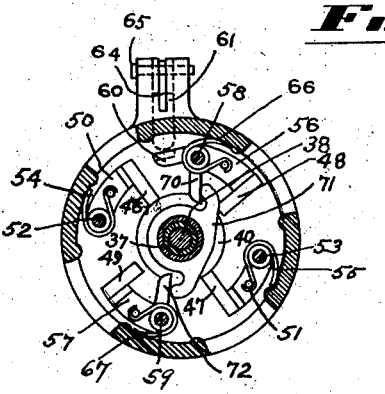
Fig. 2 is a sectional view taken on line 2—2 of Fig. 1.
Figure 3:
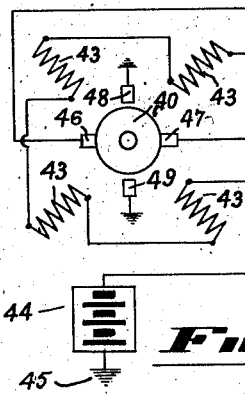
Fig. 3 is a wiring diagram of the motor included in the starting device.

As indicated by the wiring diagram shown in Fig. 3, the field shell 34 supports four pole pieces 42, two of which are shown in Fig. 1, and upon each of these pole pieces is mounted a field coil 43. These field coils 43 are connected in series with each other with a battery 44 which is grounded at 45, and with a pair of diametrically opposed brushes 46 and 47. These brushes 46 and 47 are normally in engagement with the commutator 40 but the brushes 48 and 49 which serve to complete the motor circuit are normally out of engagement with the commutator 40 as shown in Figs. 2 and 3.

Brushes 46 and 47 are mounted upon brush arms 50 and 51 respectively which are pivotally mounted upon studs 52 and 53, respectively, carried by the end frame 35. Springs 54 and 55 yieldingly urge the brushes 46 and 47 against the commutator 40. Brushes 48 and 49 are mounted upon brush arms 56 and 57, respectively, which are pivotally mounted upon studs 58 and 59, respectively, carried by the end frame 35. Brush arm 56 is provided with a lug 60 adapted to be engaged by a plunger 61 slidably supported by the end frame 35. The position of the plunger 61 is controlled by a brush shifting bar 62 having a retaining edge 63 normally in engagement with the plunger 61 at the bottom of a notch 64 provided therein. Upward movement of the bar 62 is restrained by a pin 65 carried by the end frame 35. When the bar 62 is in the position shown in the drawings, the brush 48 will be maintained in the position shown in Fig. 2.

The brush arm 56 is provided with a lug 70 which engages a brush camming plate 71 which is mounted to rotate about the axis of shaft 38. The camming plate 71 is arranged to engage a lug 72 provided on the brush arm 57. It is therefore apparent that when the brush 48 is in the position shown, the brush 49 will be maintained out of engagement with commutator 40 by reason of the mechanical connections just described. The bar 62 is arranged to be shifted, by means to be described, in such a manner as to release the plunger 61 whereupon the brushes 48 and 49 will be permitted to be brought into engagement with the commutator 40 through the action of springs 66 and 67, respectively.

Referring particularly to Fig. 4, in which the gearing connections between the starting motor and engine gear are shown in section, it will be seen that the gear 41 engages a ring gear 80 provided with a bushing 81 which is constructed to rotate about a clutch element 82 which is keyed to a shaft 83. Shaft 83 is journalled upon bearings 84 and 85 carried by end frame 32 and housing 31, respectively. The clutch member 82 is cut away to provide notches 86 in which are located rollers 87 which are normally pressed against bushing 81 by spring pressed plungers 88 which are slidably supported by clutch element 82. Rollers 87 are maintained in position by retaining plates 89 secured by means of screws 90 upon the clutch element 82. It is apparent that the clutch element 82 will be driven by the ring gear 80 when said gear rotates in the direction of the arrow 91.

The shaft 83 is splined for a portion of its length as indicated by numeral 92, to provide sliding driving engagement with a broached pinion 93.

A sleeve 100 is slidably mounted upon the shaft 83 and is provided with a pair of diametrically opposed spiral slots 101 and 102. A collar 103 is slidable upon the sleeve 100 and supports screws 104 and 105 having ends which project into slots 101 and 102, respectively. A shifting lever 106 which is pivotally mounted at 107 upon the housing 31 is bifurcated to provide arms 108 and 109 which are slotted to provide for the projection therethrough of screws 104 and 105. The collar 103 is normally maintained in position by a nut 110 secured to the sleeve 100, and by a spring 111 which bears at one end against a plain washer 112 and at the other end against a cup-shaped washer 113. Washer 113 bears against the flanged end 114 of the sleeve 100, and the periphery of said washer 113 is shaped to provide a flange 115 for the purpose to be described.

The periphery of the flange 114 is cut away to provide notches 116 in which are located rollers 117 which are arranged to provide driving connections between the sleeve 100 and a cup-shaped clutch element 118 carried by pinion 93, when said flange 114 rotates in the direction of arrow 119 (see Fig. 7). The flange 115 of washer 113 extends around clutch element 118 and engages with a surface thereof adjacent the pinion 93. It is apparent, therefore, that the washer 113 provides a retainer for the rollers 117, and a housing for the clutch element 118 and the clutch element provided on sleeve 100. A connection is provided between pinion 93 and sleeve 100 by the interlocking connection of members 113 and 118.

At the upper end of lever 106 is attached the brush shifting bar 62 and a push rod or pedal 130 provided at its upper end with a head 131. The floor board 23 supports a cup-shaped bushing 133 through which the pedal 130 slides; and a spring 132 interposed between said bushing 133 and the head 131 serves to maintain the shifting lever 106 normally in the position shown in the drawings.

The operation of the device is as follows: When it is desired to start the engine the pedal 130 is pressed causing counter clockwise rotation of shifting lever 106 and the sequent transmission of motion from said lever 106 to pinion 93 through the medium of screws 104, 105, sleeve 103, washer 112, spring 111, washer 113, and flange 114.

Where the teeth of pinion 93 are disposed in enmeshing alignment with the tooth spaces of fly wheel gear 22, the depression of pedal 130 will cause pinion 93 to slide directly into engagement with the fly wheel gear 22.

After the engagement of pinion 93 and gear 22 has taken place, further depression of pedal 130 will cause the shifting bar 62 to be shifted far enough to move retaining edge 63 out of the plunger notch 64, so as to permit brushes 48 and 49 to come into engagement with the commutator 40. At this instant the connection between the motor and battery 44 will be completed and the motor will operate to start the engine.

But in case the pinion 93 collides with the faces of certain of the teeth of gear 22 when the pedal 130 is depressed, the sleeve 100 cannot then be moved further to the right as viewed in Fig. 4. The further downward movement of pedal 130 will cause relative movement between collar 103 and sleeve 100 whereupon sleeve 100 will be rotated with respect to collar 103 by reason of the cooperation of screws 104 and 105 with the spiral slots 101 and 102. Rotation of sleeve 100 will cause pinion 93 to be rotated by virtue of the one-way clutch connection between the sleeve 100 and the pinion 93. Pinion 93 will thereupon be brought into enmeshing alignment with the fly wheel gear 22. The said movement of collar 103 relatively to sleeve 100 will cause a compression of spring 111 beyond its initial stage of compression, whereupon when pinion 93 is brought into enmeshing alignment with gear 22 in the manner described, said pinion 93 will be quickly snapped into engagement with gear 22 upon the release of spring 111. Further movement of pedal 130 will cause pinion 93 to be shifted into full engagement with gear 22 and still further movement of pedal 130 will effect the connection of the motor with the battery in the manner described.

In order to facilitate the enmeshing of the pinion with the gear the pinion teeth are bevelled as shown in Fig. 1.

It is apparent that by reason of the one-way clutch connection between sleeve 100 and pinion 93 that said pinion 93 may be turned by the motor independently of any of the manually operable connections for bringing said pinion teeth into alignment with the tooth space of the fly wheel gear 22. It is also apparent that pinion 93 may be rotated manually without turning the motor shaft 38 by reason of the one-way clutch connection between shafts 38 and 83. This feature of the invention is advantageous since it requires less foot pressure upon pedal 130, to effect the manual turning of shaft 83 and members mounted thereon, than would be required if this one-way clutch connection were not provided.

The one-way clutch connection between shafts 38 and 83 is also of importance since the engine cannot drive the motor when the engine becomes self-operative. In this manner over speeding of the motor is prevented.

It is apparent from the foregoing disclosure that this invention provides for the complete engagement of the gear between the starting device and the engine before the starting device is caused to operate to crank the engine. Therefore, all possibility of stripping the teeth of either the pinion of the fly wheel is entirely eliminated.

While the form of mechanism herein shown and described constitutes a preferred form of embodiment of the invention, it is to be understood that other forms might be adopted, all coming within scope of the claims which follow.

What I claim is as follow:

1. In a mechanism for connecting a rotatable device with a gear, the combination with a pinion slidably connected with said device; and adapted to be shifted into engagement with the gear; of manually operable means for shifting said pinion into engagement with the gear, said manual means including provisions which operate in case the pinion collides with the gear to produce rotation of said pinion while said pinion is pressed against the gear whereby said pinion will be brought into enmeshing relation with the gear, said manual means permitting said pinion to operate independently thereof while said pinion is driving said gear.

2. In a mechanism for connecting a rotatable device with a gear, the combination with a pinion slidably connected with said device and adapted to be shifted into engagement with the gear; of manually operable means for shifting said pinion into engagement with the gear, said manual means including provisions which operate in case the pinion collides with the gear to produce rotation of said pinion while said pinion is pressed against the engine whereby said pinion will be brought into enmeshing relation with the gear, said manual means permitting said pinion to operate independently thereof while the pinion drives the gear; and means automatically operable upon the release of said manual means for effecting the disconnection of the pinion from the gear.

3. In a mechanism for connecting a rotatable device with a gear, the combination with a shaft driven by said device and a pinion splined thereto, and shiftable into engagement with said gear; of manual means for shifting said pinion into engagement with said gear, said means including provisions which operate in case the pinion collides with the gear to produce rotation of said pinion while said pinion is pressed against the gear whereby said pinion will be brought into enmeshing relation with said gear.

4. In a mechanism for connecting a rotatable device with a gear, the combination with a shaft driven by said device and a pinion splined thereto, and shiftable into engagement with said gear; of manual means for shifting said pinion into engagement with said gear, said means including provisions for rotating said pinion while pressing said pinion against said gear with yielding pressure in case the pinion collides with the gear before going into mesh.

5. In a mechanism for connecting a rotatable device with a gear, the combination with a shaft driven by said device and a pinion splined thereto, and shiftable into engagement with said gear; of a rotatable and axially movable member connected with the pinion; a clutch for imparting rotary movement from said member to said pinion in one direction; and manual means for axially moving said rotatable member and for rotating the same in case the pinion collides with the gear.

6. In a mechanism for connecting a rotatable device with a gear, the combination with a shaft driven by said device and a pinion splined thereto, and shiftable into engagement with said gear; of a rotatable and axially movable member connected with the pinion; a clutch for imparting rotary movement from said member to said pinion in one direction; and manual means for axially moving said rotatable member and for rotating the same in case the pinion collides with the gear, said manual means including a spring which is compressed during rotation of the pinion by said member to assist in the axial movement of said pinion when the latter registers with the gear.

7. In a mechanism for connecting a rotatable device with a gear, the combination with a shaft driven by said device and a pinion splined thereto, and shiftable into engagement with said gear; of manual means for shifting said pinion into engagement with said gear said means including provisions for rotating said pinion in case of collision with said gear, and a spring which is compressed during the rotation of said pinion, said spring, when released by the registering of said pinion with said gear, assisting in the axial movement of said pinion.

8. In a mechanism for connecting a rotatable device with a gear, the combination with a shaft driven by said device and a pinion splined thereto, and shiftable into engagement with said gear; of a rotatable sleeve slidable on said shaft; a one-way clutch connecting said sleeve and pinion; a collar, and a spring between said collar and said sleeve for moving said sleeve axially, said spring permitting relative axial movement of the collar and sleeve in case the pinion collides with the gear; camming provisions between the collar and sleeve to rotate the latter by movement of the collar; and means for moving the collar axially while preventing the collar from turning.

9. In a mechanism for connecting a rotatable device with a gear, the combination with a shaft driven by said device and a pinion splined thereto, and shiftable into engagement with said gear; of a rotatable sleeve slidable on said shaft; a one-way clutch connecting said sleeve and pinion; collar slidable on said sleeve; a spring for imparting movement for said collar to said sleeve, said spring permitting relative axial movement of the collar and sleeve in case the pinion collides with the gear; a pin carried by said collar and cooperating with a spiral slot in said sleeve to rotate the latter by the axial movement of the collar; and means for moving the collar axially while preventing the collar from turning.

10. In a mechanism for connecting a rotatable device with a gear, the combination with a shaft driven by said device and a pinion splined thereto, and shiftable into engagement with said gear; of manual means for moving said pinion axially into mesh with said gear without rotating the pinion in case the pinion registers, but for positively rotating the pinion in case of collision with the gear to effect registration.

11. In combination with an electric self-starter motor, a gear, a pinion to mesh therewith, a pedal and connections for moving said pinion into and out of mesh with said gear, a roll clutch capable of rotating the pinion in one direction only and mechanism actuated by the pedal to rotate the roll clutch and the pinion.

12. In combination, a gear, a pinion axially movable into and out of mesh with said gear, means to rotate said pinion to turn said gear when said pinion is in mesh therewith, and mechanical means for positively turning said pinion and for moving the same axially toward said gear, said mechanical means being adapted, upon successive operations, to turn said pinion into a succession of angular positions with respect to said gear.

In testimony whereof I affix my signature.

FREDERICK J. HARDMAN,